INFORMATION STORAGE ARRANGEMENT

Filed May 28, 1959

INVENTOR
E. R. KRETZMER
BY R. C. Winter
ATTORNEY

United States Patent Office 3,098,996
Patented July 23, 1963

3,098,996
INFORMATION STORAGE ARRANGEMENT
Ernest R. Kretzmer, New Providence, N.J., assignor to Bell Telephone Laboratories, Incorporated, New York, N.Y., a corporation of New York
Filed May 28, 1959, Ser. No. 816,451
20 Claims. (Cl. 340—173)

This invention relates to arrangements for storing binary information and more specifically to such an arrangement employing capacitors as the information storage elements.

With the advent of modern computers and information handling methods, it has become ever more important to provide simple, compact and reliable equipment for the storage of information. Various arrangements are known in the art which store information in a plurality of capacitors by representing such information as the presence or absence of charge on the capacitors. Such arrangements are inherently of the temporary storage type since the charge deposited on a capacitor is bound to leak off over a period of time. Capacitive storage systems which periodically scan the storage elements and restore their original charge condition effectively achieve permanent storage of information but only with a resulting increase in cost and complexity of the capacitor memory. Storage arrangements which facilely provide permanent storage of information should, to be most advantageously employed, admit of the ready substitution of other information in the memory, should such be desired. Known systems which provide for such permanent storage may be deficient in one or more of the desired factors of simplicity, economy, reliability, and compactness requisite to modern information handling techniques.

It is a general object of this invention to provide an improved arrangement for the storage of binary information.

More specifically, it is an object of this invention to provide an information storage arrangement of improved simplicity and reliability.

It is a further object of this invention to provide an improved arrangement for permanently storing information which may, however, be readily changed if different information is to be substituted.

It should be emphasized that the instant invention is not primarily concerned with the storage of charge on a capacitor to represent stored information. Rather, this invention provides for the location of capacitors at selected positions, thus representing a particular binary digit by the presence of a capacitor at a particular point. Moreover, these capacitors are positioned on an insulating sheet which is attached to the associated equipment in a fashion which permits the ready substitution therefor of another sheet representing different information. Thus, this invention provides for the permanent storage of binary information so long as such storage is desired. However, when the stored information is to be changed such a change may be readily effected.

One specific embodiment of this invention provides for the storage of information in a matrix array between row and column conductors which may advantageously be deposited by printed wiring techniques as are known in the art. In this specific embodiment, these row and column conductors are orthogonally arrayed on opposite sides of a dielectric sheet to define a coordinate matrix of conductor crossings. The insulating sheet selected for this specific embodiment of the invention advantageously has a high permittivity or dielectric constant. At positions on the sheet corresponding to the crossing of a row and column conductor between which no capacitive coupling is desired, which positions may designate the storage of a binary "0," sections of the dielectric sheet are removed, as by punching with a die. At positions on the dielectric sheet corresponding to the crossing of a row and column conductor of the matrix at which capacitive coupling is desired, so as to store a binary "1," the dielectric is maintained intact.

With the positioning and proper alignment of the punched dielectric sheet between the row and column conductors of the matrix the stored information is read out by applying pulses successively to one set of conductors, the row electrodes for example, and sensing the existence of capacitive couplings between the pulsed conductors and the other set of conductors, the column electrodes in this example. The sensing operation is conducted on the opposite side of the sheet by detecting the pulses transmitted thereto through the dielectric portions of the sheet.

In a second specific embodiment of the invention, matrix conductors are provided in the same fashion, but the sheet employed now consists of an insulating material having a low permittivity or dielectric constant. Capacitive couplings are provided in this sheet by removing the low permittivity material at selected points and inserting plugs of a material having a high dielectric constant. This sheet then may be positioned between the matrix conductors and the stored information read out in the fashion outlined above.

It is a feature of this invention that information be stored in a matrix by specifying the locations of capacitive couplings between pairs of orthogonal electrodes.

More specifically, it is a feature of the invention that the information be stored in a dielectric sheet of the matrix by determining the location of regions of high dielectric constant in the sheet.

Another feature of this invention is the provision of means for aligning the information storage sheet between orthogonal row and column conductors so that the regions of high dielectric material are situated between selected crossings of row and column conductors to provide capacitive couplings therebetween.

It is a further feature of this invention that an insulating sheet containing areas of high permittivity, the position of which represents the storage of binary information, may be readily replaced in a matrix of opposed orthogonal row and column conductors by another such sheet to permit the change of information stored in the matrix.

A complete understanding of this invention and of these and other features thereof may be gained from consideration of the following detailed description and the accompanying drawing, in which.

Figure 1:
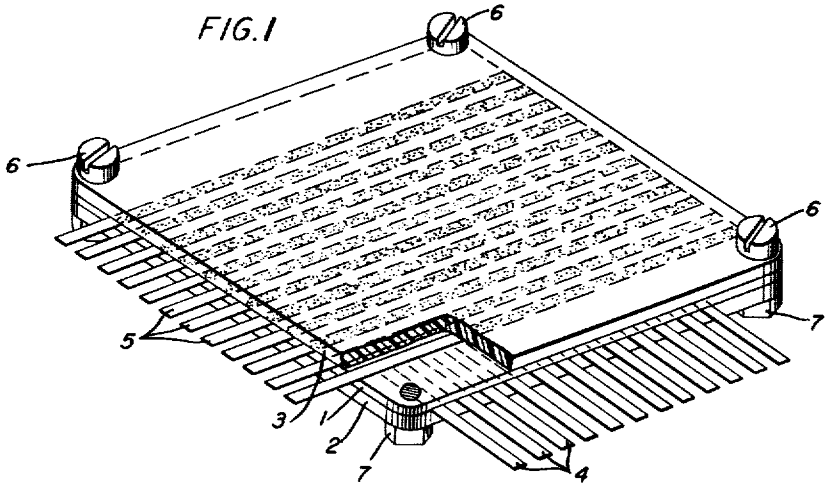
FIG. 1 is a perspective view of a capacitive storage matrix in accordance with one embodiment of the invention.

FIG. 1 represents a capacitive matrix in accordance with the invention with one section removed to show the arrangement in more detail. In FIG. 1 a sheet 1 is positioned between a pair of covering layers 2 and 3. Between the respective covering layers and the sheet 1 are positioned a plurality of lower conductors 4 and upper conductors 5. These conductors are arranged respectively parallel to each other but the upper conductors are at right angles to the lower conductors. Thus, each of the upper conductors crosses each of the lower conductors and vice versa. The covering layers 2 and 3 and their associated conductors 4 and 5 advantageously may be fabricated by printed circuit techniques, as known in the art, to produce the structure of the instant invention with improved economy, uniformity, and reliability.

The sheet 1 is fabricated in accordance with this invention so as to have regions of high permittivity at selected positions thereof. Fasteners, such as the screws 6, may be inserted in holes in the sheet 1 to assure that areas of high permittivity are properly aligned with the associated crossings of the conductors 4 and 5 and also to draw the sheet 1 and the layers 2 and 3 close together when the nuts 7 are tightened on the screws 6. The clamping of the entire arrangement in this fashion prevents misregistration of the areas of high permittivity, which are referred to hereinafter as dielectric areas, and also improves the uniformity of the contacts between the associated conductors 4 and 5 and these dielectric areas.

Figure 2A:
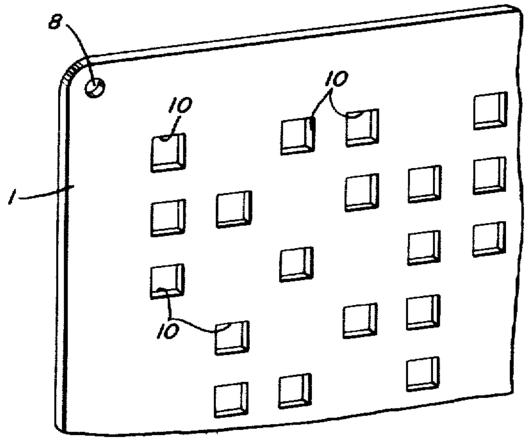
FIG. 2A represents a dielectric sheet employed in one specific embodiment of the invention.

FIG. 2A is a sketch of a section of sheet 1 which may be positioned in the arrangement depicted in FIG. 1 to provide one specific embodiment of the invention. In this specific embodiment of the invention the sheet 1 is composed of a material exhibiting a high dielectric constant. Information is stored in this sheet in accordance with the invention by removing the dielectric from regions in which it is desired to store a binary "0." Thus, each appearance of a hole in the sheet 1, such as the holes 10, represents the storage of a binary "0." Accordingly, when the sheet 1 is placed in the arrangement depicted in FIG. 1, there is an absence of capacitive coupling between a particular pair of conductors 4 and 5 which cross at the location of a hole 10. Correspondingly, a binary "1" is stored in an area of the sheet where the dielectric area remains when aligned at a crossing of a pair of conductors 4 and 5. Each row of such binary indications or digits stored in the sheet 1 represents a binary number or word of information. The upper row of the sheet 1 depicted in FIG. 2A may thus represent the binary word 010010. Also shown in FIG. 2A is an alignment hole 8 through which one of the fasteners 6 may be inserted for properly positioning the sheet 1 in the arrangement of FIG. 1.

Figure 2B:
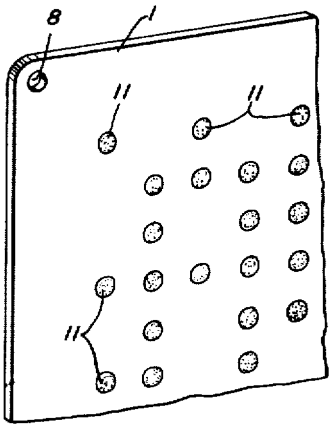
FIG. 2B represents another sheet employed in a second specific embodiment of the invention.

FIG. 2B represents a sheet 1 to be inserted in the arrangement of FIG. 1 to provide a second specific embodiment of the invention. In this instance the sheet 1 is composed of a material having a low dielectric constant. Material is removed from certain areas and plugs of another material having a high dielectric constant are inserted. Such plugs are indicated, for example, at the areas 11 in FIG. 2B. Thus, in accordance with one scheme for representing binary coded information, the areas containing plugs of high dielectric material represent binary "1's" whereas the undisturbed areas of the sheet 1 which correspond to crossings of the conductors 4 and 5 in the arrangement of FIG. 1 represent binary "0's."

The transmission of a pulse from input to output through a dielectric area of the sheet 1 may represent either a binary "1" or a binary "0" as desired. The absence of a pulse would then represent respectively a binary "0" or a binary "1."

Figure 3:
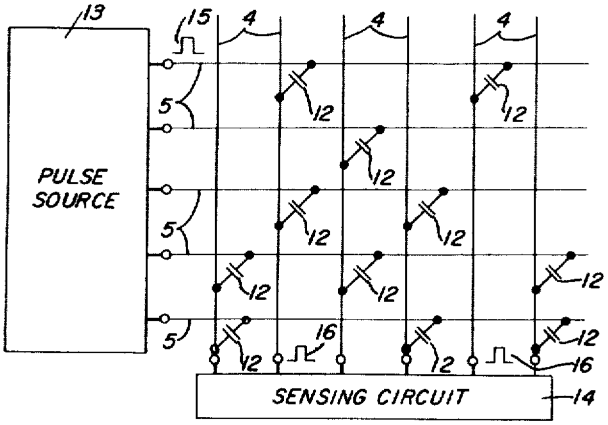
FIG. 3 represents a schematic diagram of the capacitive couplings provided by the sheet of FIG. 2A when properly positioned in the matrix of FIG. 1.

FIG. 3 depicts in schematic form an arrangement of the matrix of FIG. 1 with associated equipment for reading out the information stored in the dielectric sheet 1. The capacitive couplings shown in FIG. 3 have been arranged to correspond to the portion of the sheet 1 depicted in FIG. 2A.

In the schematic diagram of FIG. 3 row conductors 5 and column conductors 4 are arranged with crossings between every pair of respective row and column conductors. Capacitive couplings at selected conductor crossovers are represented by the capacitors 12 situated at particular locations which, in accordance with the representation adopted above, represent binary "1's." The absence of such capacitive couplings then represents the storage of binary "0's" at the remaining conductor crossings.

As already indicated, each of the rows may represent a binary word consisting of a number of binary digits. In the schematic representation of FIG. 3, the rows reading from top to bottom represent the binary words 010010, 001000, 010100, 101001, and 100101, respectively.

In reading out this stored information, each of the row conductors may be interrogated in turn, e.g., by the successive application of readout pulses from the pulse source 13 connected to the row conductors 5. When a pulse is applied to a row conductor 5, pulses appear on the column conductors 4 which are coupled through capacitors 12 to the interrogated row 5. These output pulses are applied to the sensing circuit 14 which serves to interpret such pulses collectively as the binary word which is stored in the matrix at the particular row 5.

In FIG. 3, the pulse source 13 is depicted as applying an interrogation pulse 15 to the uppermost row conductor 5. This produces corresponding pulses 16 on the column conductors 4 which are capacitively coupled to the top row 5. The sensing circuit then reads out the binary word 010010 which is stored at the interrogated row electrode.

The interrogation of the matrix does not destroy the information stored therein. In fact, the matrix of this invention may be repeatedly interrogated indefinitely without affecting its stored information. However, should it be desired to change the stored information, this is readily done by removing the fasteners 6 and 7 of FIG. 1 and replacing one dielectric sheet 1 with another carrying the new information.

It is to be understood that the above-described arrangements are illustrative of the principles of the invention. Numerous other arrangements may be devised by those skilled in the art without departing from the spirit and scope of the invention.

What is claimed is:

1. An arrangement for the storage of binary coded information comprising first and second pluralities of conductors arranged in orthogonal relationship so as to define a plurality of conductor crossovers, an insulating layer positioned between said first and second pluralities, said layer comprising a plurality of different valued capacitive couplings in selected regions thereof, means for positioning said conductors and said capacitive couplings in alignment at predetermined ones of said conductor crossovers, means for applying interrogation signals to selected conductors of said first plurality, and sensing means connected to conductors of said second plurality for sensing the signals thereon.

2. An arrangement for the storage of binary coded information comprising first and second pluralities of conductors arranged in orthogonal relationship so as to define a plurality of conductor crossovers, an insulating layer comprising a material having a high dielectric constant positioned between said first and second pluralities, said layer comprising capacitive couplings in first selected regions thereof and having apertures positioned in second selected regions thereof, means for positioning said conductors and said capacitive couplings in alignment at predetermined ones of said conductor crossovers, means for applying interrogation signals to selected conductors of said first plurality, and sensing means connected to conductors of said second plurality for sensing the signals thereon.

3. An arrangement for the storage of binary coded information comprising first and second pluralities of conductors arranged in orthogonal relationship so as to define a plurality of conductor crossovers, an insulating layer comprising a material having a low dielectric constant positioned between said first and second pluralities, said layer comprising capacitive couplings in first selected regions thereof, said first selected regions being of a material with a high dielectric constant, means for positioning said conductors and said capacitive couplings in alignment at predetermined ones of said conductor crossovers, means for applying interrogation signals to selected conductors of said first plurality, and sensing means connected to conductors of said second plurality for sensing the signals thereon.

4. An arrangement in accordance with claim 1 wherein said means for positioning said conductors and said capacitive couplings in alignment comprises means for binding said conductors and said insulating layer together in contiguous relationship to establish close contact between said layer and said conductors.

5. An arrangement for the storage of binary coded information comprising first and second pluralities of conductors arranged in orthogonal relationship so as to define a plurality of conductor crossovers, an insulating layer positioned between said first and second pluralities, said layer comprising capacitive couplings in first selected regions thereof, means for positioning said conductors and said capacitive couplings in alignment at predetermined ones of said conductor crossovers, said positioning means comprising means for binding said conductors and said insulating layer together in contiguous relationship to establish close contact between said layer and said conductors and said binding means comprising detachable fastening means for permitting the removal and replacement of said insulating layer, means for applying interrogation signals to selected conductors of said first plurality, and sensing means connected to conductors of said second plurality for sensing the signals thereon.

6. An arrangement in accordance with claim 1 wherein said positioning means comprises a pair of sheets of an insulating material having said conductors attached to said sheets.

7. A capacitive matrix for storing coded information comprising first and second cards each having parallel conductors printed thereon, said first and second cards situated adjacent each other so that the conductors of said first card are at right angles to the conductors of said second card, interchangeable third cards each containing a plurality of spots of high dielectric material at selected positions, and means for positioning one of said third cards between said first and second cards to provide capacitive couplings between selected pairs of said conductors at said selected positions, each of said couplings corresponding to one digit of a binary code.

8. A matrix comprising a pair of plates of insulating material spaced apart in substantially parallel planes, a plurality of parallel conductors on each of said plates, an insulating layer comprising material of a high dielectric constant at first predetermined positions and material of a low dielectric constant at second predetermined positions, and means for storing binary coded information in said matrix comprising means for positioning said insulating layer intermediate said first and second plates with the material at said predetermined positions of said layer in contact with a selected corresponding conductor in each of said plates.

9. An arrangement in accordance with claim 8 wherein said positioning means comprises releasable clamping means for permitting the removal of said layer and its replacement with another layer containing a different arrangement of said material of high and low dielectric constant.

10. A matrix in accordance with claim 8 and further comprising means for reading binary coded information from said matrix including means for applying signals to said conductors of one of said plates and means for sensing the occurrence of signals on said conductors of the other one of said plates.

11. An arrangement for storing binary coded information comprising first and second cards each having parallel conductors printed thereon, said cards situated adjacent each other so that the conductors of one card are at right angles to the conductors of the other card, means for establishing capacitive coupling between predetermined conductors of said first and second cards comprising a sheet of a material having a high dielectric constant with holes located therein at preselected positions, and means for positioning said sheet between said first and second cards.

12. An arrangement for storing binary coded information comprising first and second cards each having parallel conductors printed thereon, said cards situated adjacent each other so that the conductors of one card are at right angles to the conductors of the other card, means for establishing capacitive couplings between predetermined conductors of said first and second cards comprising a sheet of a material exhibiting a low dielectric constant with plugs of a material exhibiting a high dielectric constant inserted at predetermined positions therein, and means for positioning said sheet between said first and second cards.

13. An information storage arrangement comprising a matrix having row and column conductors, means for establishing a plurality of different valued capacitive couplings between selected row and column conductors to correspond to the particular information to be stored in said matrix, means for applying interrogation signals to said row of conductors, and sensing means attached to said column conductors for detecting signals on said column conductors.

14. An information storage arrangement comprising a matrix having row and column conductors, means for establishing capacitive couplings between selected row and column conductors to correspond to the particular information to be stored in said matrix, said establishing means comprising a sheet of insulating material having different values of dielectric constant at selected discrete areas thereof, means for applying interrogation signals to said row conductors, and sensing means attached to said column conductors for detecting signals on said column conductors.

15. An information storage arrangement in accordance with claim 14 wherein said sheet further comprises a material having a high dielectric constant with sections of said sheet removed at predetermined positions.

16. An information storage arrangement in accordance with claim 14 wherein said sheet further comprises a material having a low dielectric constant with pieces of a material having a high dielectric constant inserted at predetermined positions.

17. An information storage arrangement in accordance with claim 14 further comprising means for aligning said insulating sheet between said row and column conductors of said matrix to place each of said discrete areas in contact with selected corresponding row and column conductors.

18. An information storage arrangement in accordance with claim 17 wherein said aligning means further comprises releasable clamping means for permitting the substitution of a different insulating sheet providing a different pattern of capacitive couplings between said row and column conductors of said matrix.

19. An information storage system comprising a matrix of orthogonally arranged row and column conductors, means for spacing said row conductors apart from said column conductors, means for storing binary information in said matrix as the presence or absence of a capacitive coupling between orthogonal crossings of said row and column conductors, said storing means comprising portions of said spacing means defining capacitive couplings between selected orthogonal crossings of said row and column conductors, and means for reading information from a selected one of said row conductors comprising means for applying a signal to said selected row conductor and means for detecting signals from each of said column conductors.

20. An information storage matrix comprising a parallel array of row conductors, a parallel array of column conductors spaced apart from and at right angles to said row conductors so as to define a plurality of conductor crossovers, means for storing information in said matrix comprising means forming a plurality of different valued capacitive couplings at selected ones of said crossovers, and means for deriving information from said matrix comprising means for applying an input signal to a selected one of said row conductors and means for detecting output signals from each of said column conductors.

References Cited in the file of this patent

UNITED STATES PATENTS

| | | |
|---|---|---|
| 2,793,288 | Pulvari | May 21, 1957 |
| 2,847,615 | Engelbart | Aug. 12, 1958 |
| 2,872,664 | Minot | Feb. 3, 1959 |
| 2,928,075 | Anderson | Mar. 8, 1960 |
| 2,955,281 | Brennemann et al. | Oct. 4, 1960 |

FOREIGN PATENTS

| | | |
|---|---|---|
| 853,069 | Great Britain | Nov. 2, 1960 |

Disclaimer 3,098,996.—*Ernest R. Kretzmer*, New Providence, R.I. INFORMATION STORAGE ARRANGEMENT. Patent dated July 23, 1963. Disclaimer filed Feb. 2, 1966, by the assignee, *Bell Telephone Laboratories, Incorporated.*

Hereby enters this disclaimer to claims 13, 19 and 20 of said patent.

[*Official Gazette June 21, 1966.*]